United States Patent
Fursund et al.

(10) Patent No.: US 11,127,198 B2
(45) Date of Patent: *Sep. 21, 2021

(54) GRAPHICS PROCESSING USING DIRECTIONAL REPRESENTATIONS OF LIGHTING AT PROBE POSITIONS WITHIN A SCENE

(71) Applicant: Imagination Technologies Limited, Kings Langley (GB)

(72) Inventors: Jens Fursund, Copenhagen (DK); Luke T. Peterson, San Francisco, CA (US)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/858,942

(22) Filed: Apr. 27, 2020

(65) Prior Publication Data

US 2020/0258293 A1 Aug. 13, 2020

Related U.S. Application Data

(63) Continuation of application No. 15/987,466, filed on May 23, 2018, now Pat. No. 10,672,183, which is a continuation of application No. 15/059,940, filed on Mar. 3, 2016, now Pat. No. 10,008,032.

(60) Provisional application No. 62/127,430, filed on Mar. 3, 2015.

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01)

(58) Field of Classification Search
CPC ..... G06T 15/506; G06T 15/06; G06T 15/005; G06T 15/50
See application file for complete search history.

(56) References Cited

U.S. PATENT DOCUMENTS

| | | |
|---|---|---|
| 6,023,523 A | 2/2000 | Cohen et al. |
| 10,008,032 B2 | 6/2018 | Fursund et al. |
| 10,672,183 B2 * | 6/2020 | Fursund ................ G06T 15/06 |
| 2004/0160441 A1 | 8/2004 | Lokovic et al. |
| 2010/0201685 A1 | 8/2010 | Mortimer et al. |
| 2014/0327673 A1 | 11/2014 | Sousa |
| 2014/0327690 A1 | 11/2014 | McGuire et al. |

(Continued)

OTHER PUBLICATIONS

Sloan, "Stupid Spherical Harmonics (SH) Tricks," Feb. 2010, retrieved from www.ppsloan.org/publications.

*Primary Examiner* — Maurice L. McDowell, Jr.
(74) *Attorney, Agent, or Firm* — Potomac Law Group, PLLC; Vincent M DeLuca (57) ABSTRACT

Graphics processing systems can include lighting effects when rendering images. "Light probes" are directional representations of lighting at particular probe positions in the space of a scene which is being rendered. Light probes can be determined iteratively, which can allow them to be determined dynamically, in real-time over a sequence of frames. Once the light probes have been determined for a frame then the lighting at a pixel can be determined based on the lighting at the nearby light probe positions. Pixels can then be shaded based on the lighting determined for the pixel positions.

18 Claims, 4 Drawing Sheets

(56) References Cited

U.S. PATENT DOCUMENTS

2015/0290539 A1* 10/2015 Lemer .................. A63F 13/92
463/33
2016/0042559 A1 2/2016 Seibert et al.

* cited by examiner

GRAPHICS PROCESSING USING DIRECTIONAL REPRESENTATIONS OF LIGHTING AT PROBE POSITIONS WITHIN A SCENE

CROSS-REFERENCE TO RELATED APPLICATIONS AND CLAIM OF PRIORITY

This application is a continuation under 35 U.S.C. 120 of copending application Ser. No. 15/987,466 filed May 23, 2018, which is a continuation of prior application Ser. No. 15/059,940 filed Mar. 3, 2016, now U.S. Pat. No. 10,008, 032, which is a non-provisional under 35 U.S.C. 119(e) of Application Ser. No. 62/127,430 filed Mar. 3, 2015.

BACKGROUND

The description herein generally relates to 3-D rendering systems, system architectures, and methods. Some of the examples described herein relate to systems, architectures, and methods for asynchronous and concurrent hybridized rendering, such as hybridized ray tracing and rasterization-based rendering.

Graphics Processing Units (GPUs) often provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, and may be adapted to be suited for particular uses. When designing a GPU, there is often a trade-off between various factors such as performance, size, power consumption and cost. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

As an example, ray tracing is particularly suited for introducing lighting effects into rendered images. Sources of light may be defined for a scene which cast light onto objects in the scene. Some objects may occlude other objects from light sources resulting in shadows in the scene. Rendering using a ray tracing technique allows the effects of light sources to be rendered accurately since ray tracing is adapted to model the behaviour of light in the scene.

Ray tracing rendering techniques are often relatively computationally expensive and memory intensive to implement, particularly if the rendering is desired to be performed in real-time, and as such often ray tracing techniques are not suitable for implementation on devices such as mobile devices which have relatively tight constraints on processing capabilities, size and/or cost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

"Light probes" are directional representations of lighting at particular probe positions in the space of a scene which is being rendered. For example, a directional representation of lighting may be implemented as a spherical harmonic function which describes the lighting at the corresponding probe position in terms of spherical harmonic components. Once the light probes have been determined for a frame then the lighting at a surface which is visible in a pixel can be determined based on the lighting from the light probes that are near the point in space visible in the pixel. For example, an indication of the lighting for a particular pixel may be determined based on a weighted average of a set of nearest light probes to the visible point or object. Multiple probes may contribute values to the pixel through interpolation or a weighted average. The weights for the weighted average may be based on the distance between the pixel's visible position and the respective light probe position. The set of nearest light probes may include light probes for which the distance to the pixel position in world space is below a threshold value. The set of nearest light probes may include a predetermined number of light probes, for example the ten nearest light probes to the pixel position may be included in the set. The set of light probes might only include light probes which are visible from the pixel position using line-of-sight calculations.

The positions of light probes may be determined by an algorithm or heuristic, they may be supplied by an artist or game designer. The light probe positions may be determined at run time within the game or they may be included ahead of time as part of the game's design. Some probe positions may be specified relative to other objects within the game and some may be specified in absolute 3-dimensional world-space.

In examples described herein the light probes are determined dynamically, i.e. in real-time, as frames are rendered. Due to restrictions on processing resources on the device on which a graphics processing system is implemented, it is often infeasible for the lighting function represented by light probes to be fully calculated for each frame, so in examples described herein, the light probes determined for a previous frame may be updated or partially updated for a current frame. Determining the light probes in this manner may be sufficiently accurate if the difference in lighting from one frame to the next is small, which is often the case for a sequence of frames rendered for an application such as a game application.

There is provided a machine-implemented method of graphics processing, comprising:
  for each frame of a sequence of frames, determining visible surfaces of a scene for pixels in the frame, from a viewpoint for the frame;
  for each probe position of a plurality of probe positions within the scene, maintaining a directional representation of lighting by:

tracing one or more rays from the probe position to determine, for each of the one or more rays, a lighting contribution for the probe position from the direction of the ray; and updating the directional representation of lighting for the probe position based on the determined lighting contribution for each of the one or more rays;

using the directional representations of lighting for the probe positions to determine lighting indications for the determined visible surfaces of the scene for pixels in the frame; and shading the pixels in the frame in accordance with the determined lighting indications.

The above steps may be spread over a sequence of frames and are not required to be performed during the processing for a single frame. For example, rays may be cast during one frame and the resulting data may be used during a subsequent frame.

Updating the directional representation of lighting for a probe position may comprise: transforming the one or more determined lighting contributions for the one or more rays into a set of component values associated with respective components of the directional representation of lighting for the probe position; and combining the component values for the one or more rays with existing component values of the directional representation of lighting for the probe position. The combining of the component values for the one or more rays with existing component values of the directional representation of lighting for the probe position may comprise maintaining a running average the component values of the directional representation of lighting for the probe position over the sequence of frames.

The tracing of a ray for a probe position may comprise selecting a direction for the ray. For example, a direction for a ray may be selected randomly or pseudo-randomly, including using Monte Carlo methods and quasi-Monte Carlo methods, low discrepancy sequences, and other types of structured noise or sampling patterns. In other examples a direction for a ray may be selected based on a selection scheme wherein the directions are selected from a set of available ray directions. The selection scheme may be a round robin scheme. The selection scheme may be biased towards selecting directions which are towards regions of relatively high luminosity in the scene, or areas of the scene where the lighting conditions are known to have recently changed. The direction for a ray may be selected from the set of available ray directions based on the respective intervals (e.g. times or number of frames) since the available ray directions were most recently selected for the probe position. The direction for a ray for a particular probe position may be selected based on directions selected for nearby probe positions.

In some examples, the directional representations of lighting are defined in terms of spherical harmonic components. In other examples, the directional representations of lighting are defined in terms of components in a three-dimensional Cartesian coordinate system.

The lighting indication for a determined visible surface of the scene for a pixel in the frame may be determined by: identifying a set of probe positions for the pixel; and implementing a distance-based weighting of the directional representations of lighting for the identified set of probe positions. Identifying a set of probe positions for the pixel may comprise: identifying an initial set of probe positions for which the distance between the pixel position and the probe positions is less than a threshold distance; and identifying which of the initial set of probe positions is visible from the pixel position.

In some examples, the step of using the directional representations of lighting for the probe positions may comprise: determining local probe data at local probe positions within the scene based on the directional representations of lighting for the probe positions; and using the local probe data of the local probe positions to determine the lighting indications for the determined visible surfaces of the scene for pixels in the frame.

A local probe may correspond to a set or subset of pixels. Local probe data can be calculated from other probes and can be computed using 3-dimensional methods. Those 3 dimensional methods may involve determining line of sight occlusions in order to weight the validity of data from other probes. Local probe data can allow pixel values to be more efficiently calculated using 2-dimensional methods like interpolation.

There is further provided a graphics processing unit configured to render a sequence of frames, the graphics processing unit comprising:

surface identification logic configured to determine, for each frame of the sequence of frames, visible surfaces of a scene for pixels in the frame, from a viewpoint for the frame; and processing logic configured to:

maintain a directional representation of lighting for each probe position of a plurality of probe positions within the scene, by:

tracing one or more rays from the probe position to determine, for each of the one or more rays, a lighting contribution for the probe position from the direction of the ray; and updating the directional representation of lighting for the probe position based on the determined lighting contribution for each of the one or more rays;

use the directional representations of lighting for the probe positions to determine lighting indications for the determined visible surfaces of the scene for pixels in the frame; and shade the pixels in the frame in accordance with the determined lighting indications.

There is also provided a machine-implemented method of graphics processing, comprising:

for each frame of a sequence of frames, determining visible surfaces of a scene for pixels in the frame, from a viewpoint for the frame;

for each probe position (which may be referred to as a "high-level" probe position) of a plurality of probe positions within the scene, maintaining a directional representation of lighting (e.g. by tracing rays in the scene);

determining a plurality of low-level probe positions within the 3d scene based on the visible surfaces;

for each of the low-level probe positions, determining directional lighting representations at its position by incorporating data from one or more of the directional representations of lighting maintained for probe positions within the scene;

using the directional representations of lighting for the low-level probe positions to determine lighting indications for the determined visible surfaces of the scene for pixels in the frame; and shading the pixels in the frame in accordance with the determined lighting indications.

There is provided the above method wherein the density of low-level probe positions is greater than the density of high-level probe positions within a local region of world-space.

The lighting indication for the visible surface for a pixel may be determined by interpolating in 2 dimensions between the directional representations of lighting for a set of low-level probe positions for the pixel. Selection of valid local probes for interpolation may involve determining whether they are similar to the pixel's visible surface with regard to world-space position or depth from the virtual camera. Alternatively similarity to the visible surface may be a weighting factor used in the interpolation.

There is provided a machine-implemented method of graphics processing, comprising:
  for each probe position of a plurality of probe positions within the scene, maintaining a directional representation of lighting by:
    tracing one or more rays from the probe position to determine, for each of the one or more rays, a lighting contribution for the probe position from the direction of the ray; and
    updating the directional representation of lighting for the probe position based on the determined lighting contribution for each of the one or more rays;
  wherein the updating comprises a form of averaging between the ray contribution data and existing probe lighting data.

There is provided the method above wherein the rays are biased towards directions of increased importance and the averaging accounts for the change in probability.

There is also provided a non-transitory computer readable storage medium having stored thereon a computer readable description of an integrated circuit that, when processed in an integrated circuit manufacturing system, causes the integrated circuit manufacturing system to manufacture a graphics processing unit as described in any of the examples herein. The graphics processing units described herein may be embodied in hardware.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a person skilled in the art, and may be combined with any of the aspects of the examples described herein.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Figure 1:
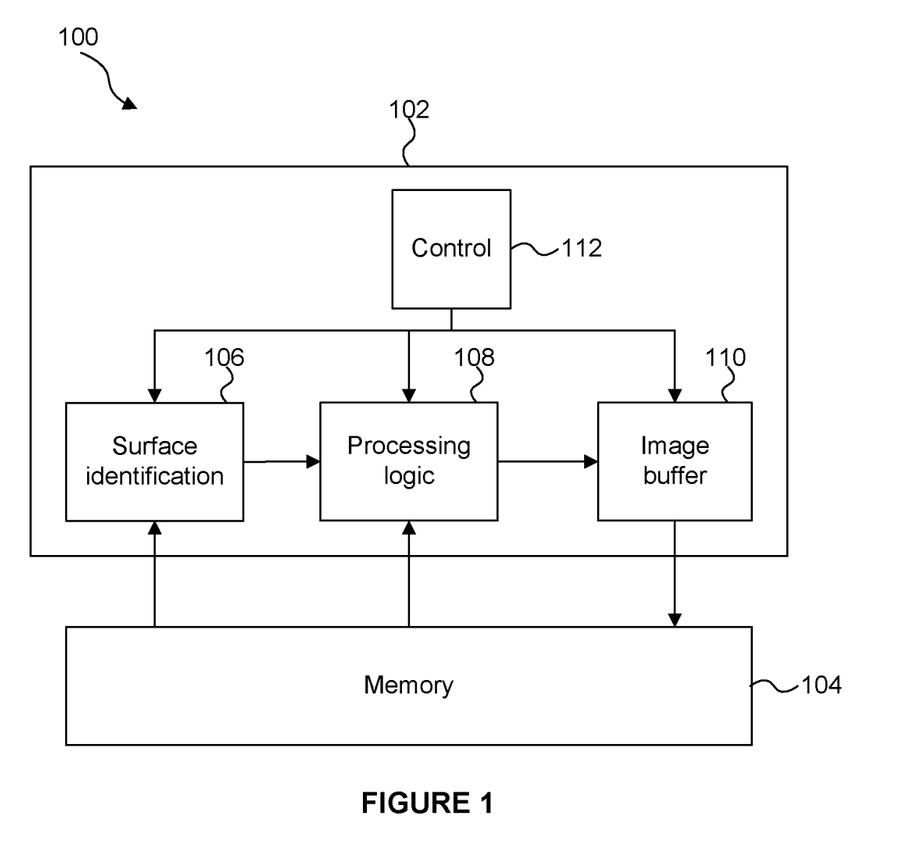
FIG. 1 shows a graphics processing system.

FIG. 1 illustrates a graphics processing system 100 which comprises a graphics processing unit 102 and a memory 104. The graphics processing unit 102 comprises surface identification logic 106, processing logic 108, an image buffer 110 and control logic 112. The surface identification logic is configured to identify surfaces within a scene being rendered. The processing logic 108 comprises one or more execution cores and is configured to process graphics data for surfaces identified by the surface identification logic 106. The image buffer is configured to store rendered pixel values. The control logic 112 is configured to control the operation of the graphics processing system 100.

Figure 2:
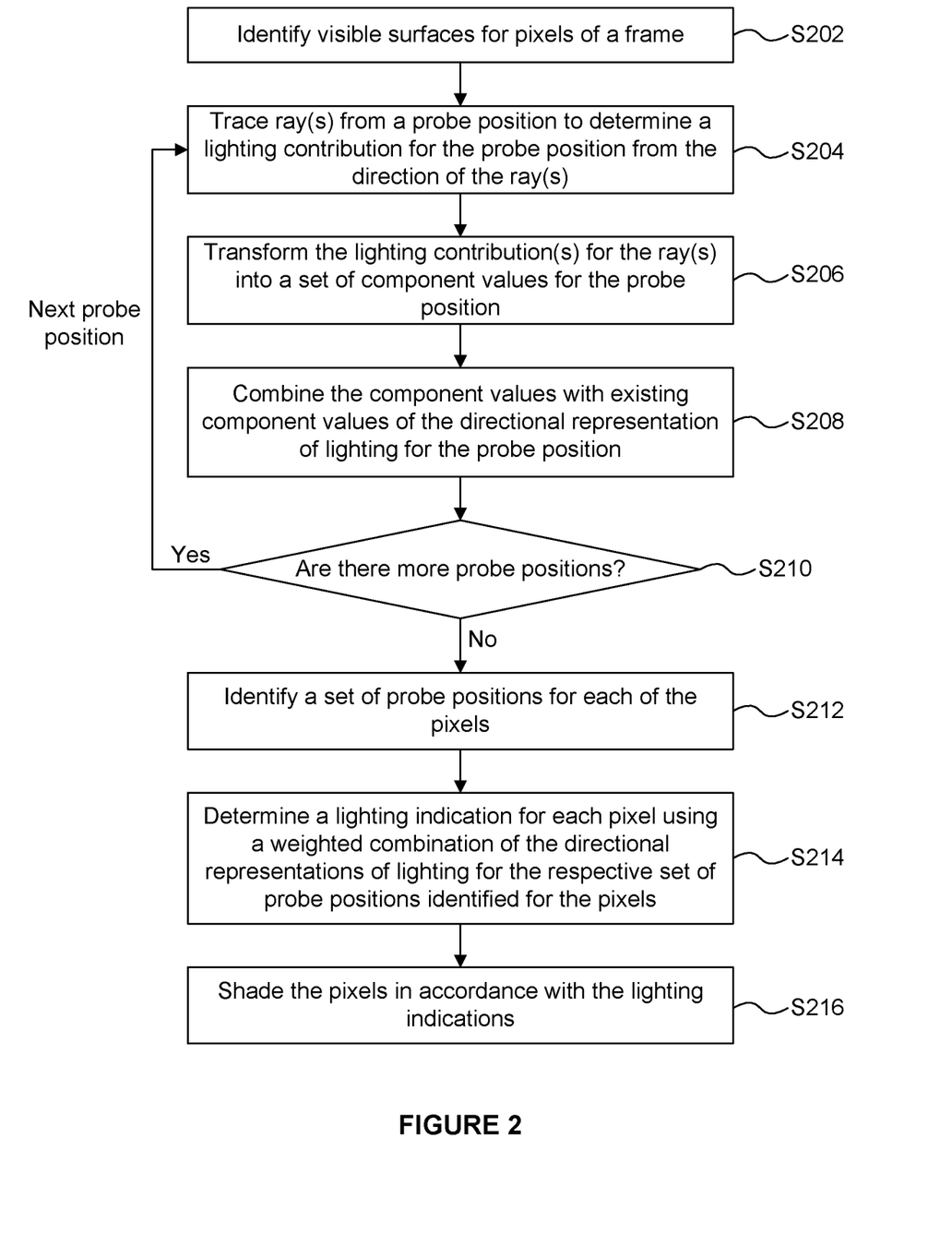
FIG. 2 is a flow chart for a method of graphics processing.

An example of the operation of the graphics processing system 100 is described with reference to the flow chart in FIG. 2.

Graphics data representing objects in a scene is received at the graphics processing unit 102. The graphics data may comprise primitives which represent surfaces of objects to be rendered. Primitives are often triangles, but can take other forms, e.g. other two-dimensional shapes, or points or lines. A primitive may be defined by a set of vertices, e.g. three vertices define a triangular primitive. The graphics data may include vertex data (e.g. position data and attribute data, such as texture data) for the vertices of the primitives in the scene and indications for the primitives to indicate which of the vertices form the primitives.

In step S202 the surface identification logic 106 identifies visible surfaces for pixels of a frame. In other words, a frame is to be rendered to represent a view of the scene from a particular viewpoint, and the frame comprises an array of pixel positions. For each pixel position of the frame, a surface in the scene which is primarily visible in that pixel is identified in step S202. Indications of the visible surfaces for the pixels are provided from the surface identification logic 106 to the processing logic 108. One or more different methods may be used by the surface identification logic 106 to identify visible surfaces for the pixels in the scene, e.g. rasterisation or ray tracing may be used to identify visible surfaces. Methods of rasterisation and methods of ray tracing for identifying visible surfaces for pixels are known in the art, and as such for conciseness, the details of those methods are not described in detail herein.

Figure 3:
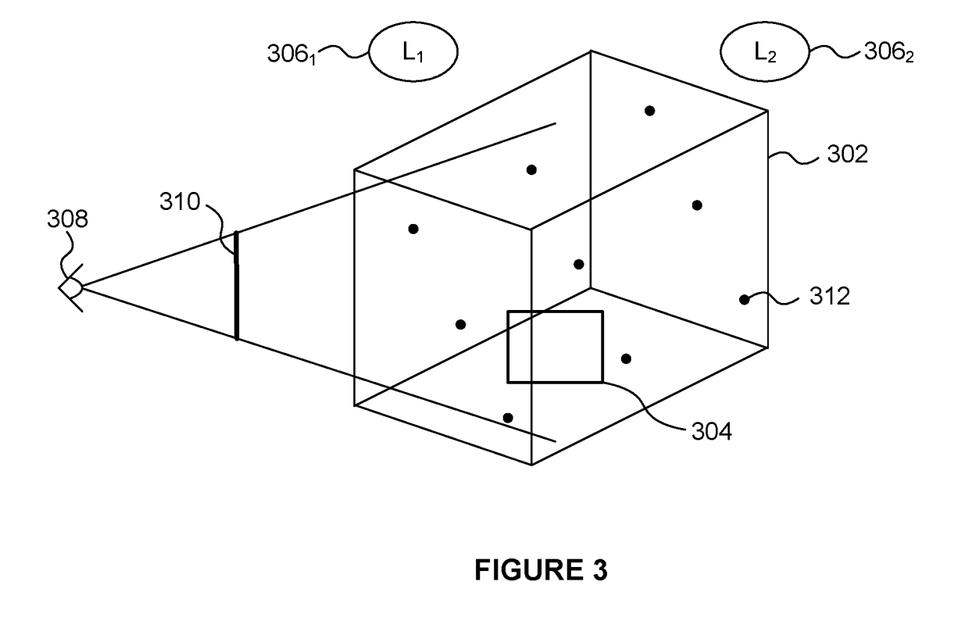
FIG. 3 illustrates a scene to be rendered from a viewpoint.

FIG. 3 shows an example of a scene 302 which a surface 304. This is a very simple example, and in other examples there would likely be many more surfaces and objects within the scene. FIG. 3 shows two light sources 306$_1$ and 306$_2$ which illuminate objects in the scene. The viewpoint from which the scene is viewed is shown at 308 and the view plane of the frame to be rendered is represented at 310. The black dots (one of which is denoted 312) represent light probes in the scene 302. The light probes may be distributed throughout the scene 302, e.g. according to a predetermined pattern, and may for example be positioned by an artist or scene generation tool. For example, an artist designing the scene 302 may identify suitable positions within the scene 302 for light probes to be positioned.

The lighting at the probe positions can be determined and stored, and then the lighting at visible surfaces identified for pixel positions can be determined based on the lighting at the probe positions. The use of light probes in this manner can greatly simplify the processing involved in determining the lighting at the visible surfaces identified for the pixels positions. In contrast to light maps, light probes are not typically attached to any particular surface within the scene 302, and as such are not affected by surface normals of surfaces in the scene 302.

In step S204, for a probe position 312, the processing logic 108 traces one or more rays from the probe position to determine a lighting contribution for the probe position from the direction of the ray(s). The tracing of the rays may involve direct evaluation of the lighting on the intersected surface, it may involve path tracing, or it may involve retrieving data from an additional lighting structure e.g. a lightmap, and possibly a structure comprising probes.

In methods described herein, the number of rays which are traced from a probe position for a frame may be fewer than would be needed to accurately describe an omnidirectional representation of the lighting at the probe position without any additional information. As an example, fewer than five rays may be traced in step S204 for a particular probe position, such that the amount of processing involved in step S204 is not prohibitive for implementing the method in real-time. As will be described below, the data determined in step S204 for a probe position is combined with previously determined data for the probe position from previous frames in order to determine a sufficiently accurate omnidirectional representation of lighting at the probe position. In this sense, the value of light probes is progressively refined over a sequence of frames. In other words, a progressive refinement approach is adopted whereby each ray contributes to an average that ultimately converges on the correct value. This is in contrast to prior art systems which attempt to compute the entire value of a light probe in one sequence of operations. Methods described herein can apply as much (or as little) processing power depending on availability and requirement for accuracy.

In step S204 the processing logic 108 may select the directions of the rays to be traced. There are many ways in which the directions for the rays may be selected. For example, the directions may be selected randomly (including pseudo-randomly). Alternatively, the directions may be selected with a view to providing the most useful information for updating a previously stored representation of the lighting at the probe position. For example, the directions may be selected from a set of available ray directions, e.g. all of the 3D directions may be quantised into a finite set of ray directions from which directions can be selected for rays. A round robin selection scheme could be used such that each direction is selected in turn over a number of frames. This can ensure an even sampling of the different ray directions over a sequence of frames. Alternatively a low discrepancy sequence or another quasi-monte-carlo method or structured noise approach could be used to achieve even coverage of the sampling space. A different selection scheme may be biased towards selecting directions which are towards regions of relatively high luminosity, e.g. towards the light sources $306_1$ and $306_2$ or towards regions with brighter reflections. Regions of relatively high luminosity are likely to contribute more to the lighting at a probe position than regions of lower luminosity, so it may be beneficial to sample the higher luminosity regions more often than lower luminosity regions. Alternative importance indicators may also be useful to guide sampling. These include knowledge of change in scene lighting caused by moving lights, changing lights, moving objects, etc. The selection scheme may take into account an interval (e.g. an amount of time, or a number of frames) since the rays were most recently selected for a probe position. This can ensure that some ray directions are not neglected for a long time. Furthermore, the selection scheme may select directions for rays to be traced for a probe position based on directions selected for nearby probe positions.

In step S206 the processing logic 108 transforms the lighting contributions for the rays traced in step S204 into a set of component values associated with respective components of the directional representation of lighting for the probe position. For example, the directional representation of lighting for a probe position may be defined in terms of spherical harmonic components. Spherical harmonic functions are known in the art. In this example, the spherical harmonic function representing lighting at a probe position is a function that can take a 3D direction as an input and provide a lighting indication (e.g. an intensity) for light received at the probe position from the 3D direction. Spherical harmonic functions are a good way of storing directional functions with a small amount of storage requirements for the components of the function.

In another example, the directional representation of lighting for a probe position may be defined in terms of components in a 3D Cartesian coordinate system, e.g. such that the components are defined along the x, y and z axes.

Methods for implementing the transformation of step S206 would be known to a person skilled in the art. For example, the steps of transforming a lighting indication from a particular ray direction into a set of spherical harmonic components are known in the art.

In step S208 the component values determined in step S206 are combined with existing component values of the directional representation of lighting for the probe position. The existing component values may be stored from a previous frame of the sequence of frames being rendered. For example, a running average may be maintained for the component values of the directional representation of lighting for the probe position over the sequence of frames. The weighting with which the component values determined for the current frames are combined with the existing component values may be fixed, or may vary depending the similarity in between the frames. For example, if the scene is relatively static then previous lighting estimates are likely to be more valid than if the scene is relatively dynamic. Therefore, if the scene is relatively static then previous component values of the representation of lighting may be weighted more heavily than if the scene is relatively dynamic.

The weighting by which the new samples affect the old samples may be calculated as a function of the tolerance for stale lighting data in the probes. If the lighting conditions change slowly, existing data would be weighted more heavily in order to represent more valid data in the probe and achieve a smoother and more accurate average. Likewise when the lighting data changes quickly, the relative weighting can be adjusted.

In a situation where it is not desirable for the old lighting data to decay, an average may be computed whereby the sum of lighting from the rays is tracked separately from the number of rays in the average and the division is performed as the probe data is needed. This gives equal weighting to old samples and new samples and will provide a continuously refining average.

Steps S206 and S208 together can be seen as updating the directional representation of lighting for a probe position based on the determined lighting contribution for each of the rays traced in step S204 for the probe position. The directional representations of lighting for the probe positions are stored.

The light probes (or "directional representations of lighting") may be capable of storing direct and/or indirect lighting information, but in some examples the light probes only store indirect lighting information.

In step S210 the processing logic 108 determines whether there are more probe positions to be resolved for the current frame. If there are more probe positions then the method passes back to step S204 and repeats for the next probe position. Although this diagram illustrates the process as serial, modern graphics processing systems may perform many computations in parallel. When step S210 determines that there are no more probe positions to be resolved for the current frame then the method passes to step S212. At this point a set of light probes 312 have been resolved for the current frame which indicate a directional representation of light passing through the probe positions 312 within the scene 302. If an object was located at a probe position then it would be lit by the light indicated by the appropriate light probe. For surfaces of objects that are not located at a probe position the lighting can be determined using a combination of light probes, as described below.

In step S212, for each of the pixels, the processing logic identifies a set of probe positions. For example, probe positions which are nearby the visible surface identified for a pixel in step S202 are identified. In this way the nearest light probes in world space to the surface which is visible at the pixel are identified.

In step S214 the processing logic determines a lighting indication for the surfaces of the scene for the pixels using a weighted combination of the directional representations of lighting for the set of probe positions identified for the pixels. The weighted combination could be a distance-based weighting, e.g. where the weights can be based on $1/d$ or $1/d^2$ where d is the distance between the point on a surface (e.g. surface 304) which is visible in a pixel and the probe position. Furthermore, a distance falloff threshold may be included in the weighted combination, whereby once the threshold has been crossed, the contribution of a light probe to a pixel's lighting is tapered quickly but smoothly to zero. This avoids jarring changes when a probe is moved into or out of the set of probes under consideration affecting the total weight.

Once a lighting indication has been determined for a pixel, in step S216 the processing logic 108 shades the pixel to determine a rendered pixel value. The rendering process includes applying lighting to the pixel in accordance with the lighting indication determined for the pixel. The rendered pixel values can be stored in the image buffer 110. When all of the pixels of a frame have been rendered the frame may be output from the image buffer 110, e.g. to be stored in the memory 104 and/or for display on a display and/or for transmission to another device.

The identification of the set of probe positions for a pixel in step S212 may also take into account the visibility of the probe position from the surface 304 which is visible in the pixel. For example, if an object moves to completely surround a probe then there will be very little light reaching the probe. That probe will be dark, and, if visibility were not taken into account, points on the object's surface could then be incorrectly darkened by including the probe's information in their average. In the case of a completely dark probe, the answer is easy: the probe is effectively disabled and doesn't contribute to the lighting of the pixels. However, in a more ambiguous situation, the solution isn't as simple unless the visibility of the probe position for a pixel is taken into account. For example, an initial set of probe positions could be identified for a pixel for which the distance between the pixel position and the probe positions is less than a threshold distance. Then that initial set of probes can be reduced by identifying which of the initial set of probe positions is visible from the pixel position, such that the remaining set of probe positions only includes probe positions that are visible from the pixel position. The visibility of the probe positions from the pixel position may be determined by tracing rays between the pixel position and the probe positions to determine whether the rays intersect any occluding geometry. This works well, but involves evaluating intersection tests at a number of sample points along rays from a pixel position to each initial probe position, so the processing cost may be relatively high.

Another solution to the problem of probe occlusion involves allowing an artist or content creation tool to specify a volume of effect for probes. For example, some probes could effect a large radius if they were positioned in the center of a room, while other probes near a surface may have a much smaller radius of effect. In addition, the volume of effect can be a non-spherical volume, for example a box, a tetrahedron, a parametric volume, or even a volume described with constructive solid geometry operations.

As described above, the positions of the light probes 312 are defined in the world-space of the scene 302, e.g. according to a predetermined pattern, or as determined by an artist or scene generation tool. In some examples, the light probes could be positioned to follow particular elements of geometry in the scene 302 which are of interest. For example, a character in a game application may be an element of geometry of interest, and have a strong effect on the lighting in the immediate vicinity of the character. The lighting effects on a surface may be more accurately determined if there are light probes near to the surface in the scene, and/or if the density of light probes is high in the region surrounding the surface. Therefore, by determining the position of some light probes based on the position of elements of geometry which are of interest, the accuracy of the determination of the lighting on the surfaces of the geometry of interest can be improved. In this way, more probes are provided in regions where more detail in the lighting is particularly beneficial to the perceived quality of the image. By allowing light probes to follow geometry of interest, the lighting in dynamic scenes can be modeled accurately for regions of interest.

Steps S212 and S214 can collectively be considered to be using the directional representations of lighting for the probe positions to determine lighting indications for the determined visible surfaces of the scene for pixels in the frame. One approach to reducing the processing cost of performing steps S212 and S214 is to use "local probes" or "low-level probes". The probes described above (e.g. probes 312 shown in FIG. 3) can be considered to be "global probes" or "high-level probes". As described above, for each of the high-level probes, a directional representation of lighting is maintained by tracing rays in the scene. The low-level probes are positioned in the scene based on the world-space positions shown by the pixels. For example, the low-level probe positions can be determined based on a projection of pixel positions into the scene. As an example, a low-level probe position can be determined for each 16×16 block of pixels.

A collection of local probes (i.e. low-level probes) can be represented as a low resolution screenspace buffer temporarily storing probe-like data that is then used as an interpolation source for individual pixels. When the positions of the local probes has been determined for a frame, the positions may remain constant in world-space over a sequence of frames, such that new local probe positions are not generated for each frame which could result in temporal aliasing. If new local probe positions were re-generated for each frame, the lighting might "shimmer" or "sizzle" because of minor variations in the positions of the local probes as the camera moves (i.e. as the viewpoint 308 moves). To correct for this, the buffer of low-level probes is reprojected to account for changes in the camera viewpoint. The density of the low-level probe positions is often greater than the density of high-level probes in a local region of world-space near the visible surfaces. This means that a visible surface for a pixel position tends to be closer to a set of local probes than to a set of global probes. Therefore, determining the lighting at a pixel position (e.g. based on interpolation of lighting at probe positions) tends to be more accurate if the interpolation is over local probes rather than global probes.

A directional representation of lighting is determined for each of the low-level probe positions based on the directional representations of lighting for a plurality of the high-level probe positions. For example the lighting at the local probe positions can be determined based on a weighting of nearby global probes. In some examples, local probes are based on a combination of global probes within a distance threshold and which are visible form the local probe position. Occlusion testing of a subset of the global probes from a local probe position can be performed using ray tracing to determine which of the subset of global probe positions are visible from the local probe position. As an example, the subset may include the twelve nearest global probes for a local probe, and the occlusion testing determines which of those twelve global probes have a direct line of sight to the local probe position, and then those visible global probes are combined to determine the directional representation of lighting at the local probe position.

One advantage of using local probes to aggregate data from one or more global probes is to allow costly operations like line-of-sight determinations for occluded probes to be determined less frequently and amortized across a larger number of visible pixels.

Once the directional representations of lighting at the local probe positions have been determined (i.e. once the local probes have been "resolved"), they can be used as described above to determine lighting indications for the determined visible surfaces of the scene for pixels in the frame. This may involve interpolating between the directional representations of lighting for a set of nearest low-level probe positions for a pixel. Since the density of local probes is higher than the density of global probes, a simple interpolation between local probes may be sufficiently accurate for determining the lighting at a pixel position, without interpolation artifacts being noticeable. In some cases it may be sufficient to perform the interpolation in 2-dimensional screen-space, provided a consistency check validates that the local probe and the visible surface are near enough to each other in world-space to be representative. In addition, some undesirable artifacts can be avoided by associating multiple local probes at different distances from the camera, when necessary, near the surfaces visible in a given region of pixels.

Once lighting has been interpolated for a pixel, the pixels can be shaded as described above in accordance with the determined lighting indications.

The processing logic 108 may ensure that all of the pixels in the viewplane 210 are within the influence of a sufficient number of local probes. If this is not initially the case for a pixel then additional local probes can be deposited in the scene 302 near the visible surface for the pixel. For example, this could be done using a screenspace filter. A depth-percentage-threshold could be used to determine if a local probe qualified as being within range or not. If there are not a sufficient number of local probes (e.g. at least 3) that a given sample pixel could interpolate between, additional local probes can be deposited for the sample pixel with different camera depth position values, in order to put them within range of the visible surface for the sample pixel.

As mentioned above, to avoid temporal aliasing, the local probes may remain locked in world-space, even when the camera moves. Local probes that are no longer visible can be deallocated, and new local probes can be created for new areas of the screen that don't already have any local probes. The local probes may be stored as a deep, low-resolution screenspace buffer. Every time the camera moves, he buffer is re-projected and the gaps can be filled in by creating new local probes. An equally valid approach for storing the local probes is to use a 3D storage and lookup structure like a grid, a kd tree, or any other kind of 3d spatial structure.

Figure 4:
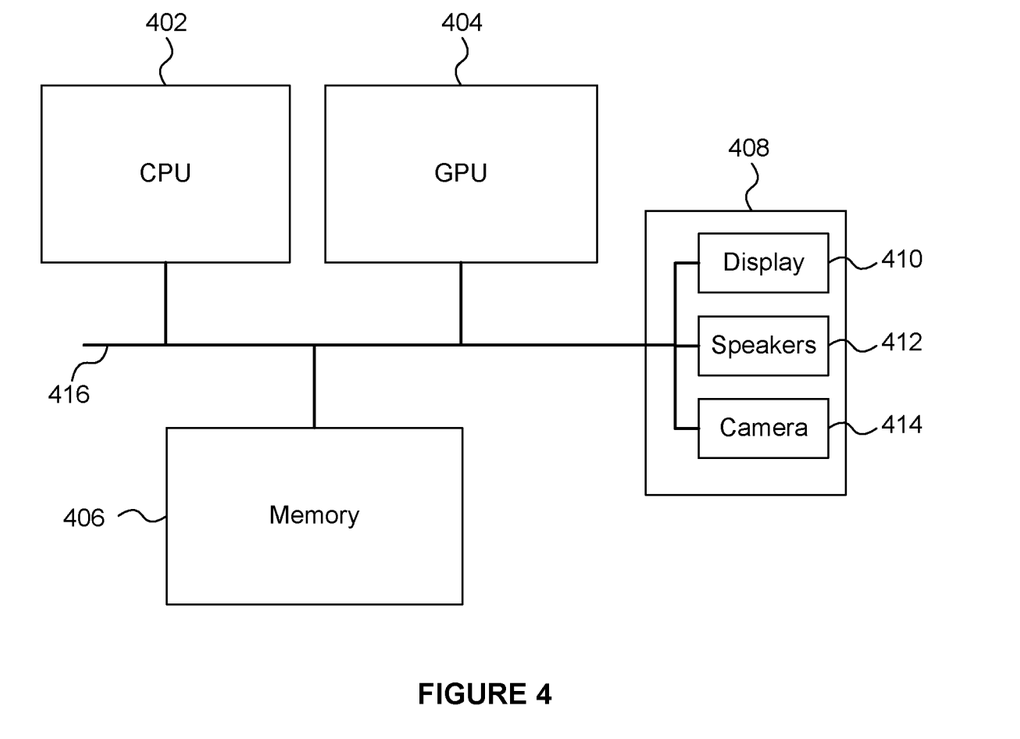
FIG. 4 shows a computer system in which a graphics processing system is implemented.

FIG. 4 shows a computer system in which the graphics processing systems described herein may be implemented. The computer system comprises a CPU 402, a GPU 404, a memory 406 and other devices 408, such as a display 410, speakers 412 and a camera 414. The GPU 404 may correspond with the GPU 102 described above. The memory 406 may correspond with the memory 104 described above. The components of the computer system can communicate with each other via a communications bus 416.

The graphics processing unit 102 is shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 5.

Figure 5:
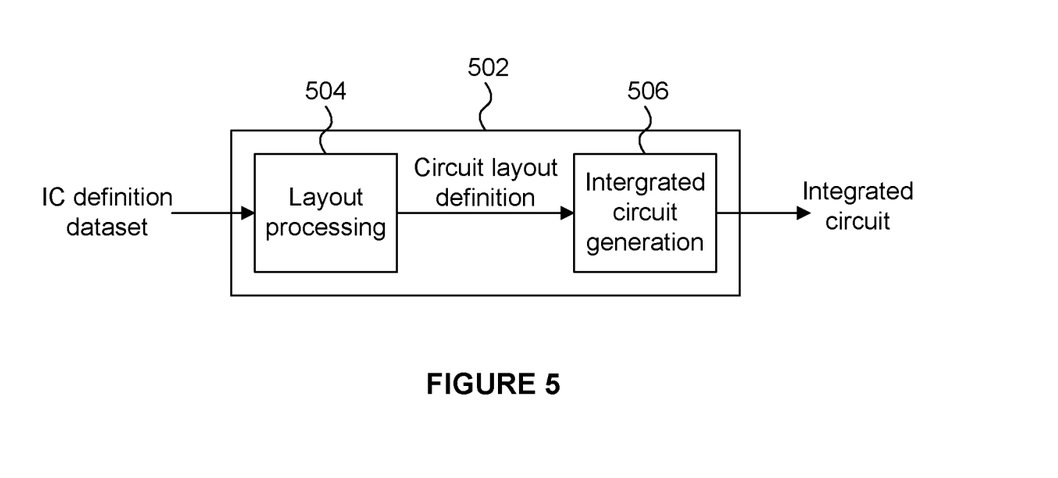
FIG. 5 shows an integrated circuit manufacturing system for generating an integrated circuit embodying a graphics processing system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 502 to manufacture an integrated circuit embodying a graphics processing unit as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC.

The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A machine-implemented method of graphics processing for rendering a sequence of frames, the method comprising:
    for each probe position of a plurality of probe positions within a scene, maintaining a directional representation of lighting over the sequence of frames by:
        updating an existing directional representation of lighting for the probe position from a previous frame based on a lighting contribution for each of one or more rays; and
        using the directional representations of lighting for the probe positions for rendering a current frame representing an image of the scene.

2. The machine-implemented method of claim 1, wherein said updating an existing directional representation of lighting for a probe position comprises a form of averaging between existing probe lighting data and the lighting contribution for one or more of said rays.

3. The machine-implemented method of claim 2, wherein the rays are biased towards directions of increased importance and the averaging accounts for a change in probability.

4. The machine-implemented method of claim 1, further comprising for each frame of the sequence of frames, determining visible surfaces of the scene for pixels in the frame, from a viewpoint for the frame.

5. The machine-implemented method of claim 4, wherein the directional representations of lighting for the probe positions are used to determine lighting indications for the determined visible surfaces of the scene for pixels in the frame.

6. The machine-implemented method of claim 5, further comprising shading the pixels in the frame in accordance with the determined lighting indications.

7. The machine-implemented method of claim 1, wherein said updating an existing directional representation of lighting for a probe position comprises:
    transforming the one or more lighting contributions for the one or more rays into a set of component values associated with respective components of the directional representation of lighting for the probe position; and
    combining the component values for the one or more rays with existing component values of the directional representation of lighting for the probe position.

8. The machine-implemented method of claim 7, wherein said combining the component values for the one or more rays with existing component values of the directional representation of lighting for the probe position comprises maintaining a running average of the component values of the directional representation of lighting for the probe position over the sequence of frames.

9. The machine-implemented method of claim 1, further comprising storing the directional representations of lighting for the probe positions.

10. The machine-implemented method of claim 1, wherein the directional representations of lighting are defined in terms of spherical harmonic components.

11. The machine-implemented method of claim 1, further comprising determining local probe data at local probe positions within the scene based on the directional representations of lighting for the probe positions.

12. A graphics processing unit for rendering a sequence of frames, the graphics processing unit comprising processing logic configured to:
    maintain a directional representation of lighting over the sequence of frames for each probe position of a plurality of probe positions within a scene, by:
        updating an existing directional representation of lighting for the probe position from a previous frame based on a lighting contribution for each of one or more rays; and
        use the directional representations of lighting for the probe positions for rendering a current frame representing an image of the scene.

13. The graphics processing unit of claim 12, wherein said updating an existing directional representation of lighting for a probe position comprises a form of averaging between existing probe lighting data and the lighting contribution for one or more of said rays.

14. The graphics processing unit of claim 13, wherein the rays are biased towards directions of increased importance and the averaging accounts for a change in probability.

15. The graphics processing unit of claim 12, further comprising surface identification logic configured to determine, for each frame of the sequence of frames, visible surfaces of the scene for pixels in the frame, from a viewpoint for the frame; and
    wherein the processing logic is configured to:
    use the directional representations of lighting for the probe positions to determine lighting indications for the determined visible surfaces of the scene for pixels in the frame; and
    shade the pixels in the frame in accordance with the determined lighting indications.

16. The graphics processing unit of claim 12, wherein the processing logic is configured to update an existing directional representation of lighting for a probe position by:
    transforming the one or more lighting contributions for the one or more rays into a set of component values associated with respective components of the directional representation of lighting for the probe position; and combining the component values for the one or more rays with existing component values of the directional representation of lighting for the probe position by maintaining a running average of the component values of the directional representation of lighting for the probe position over the sequence of frames.

17. The graphics processing unit of claim 12, wherein the processing logic is configured to determine a lighting indication for a determined visible surface of the scene for a pixel in the frame by:

identifying a set of probe positions for the pixel; and implementing a distance-based weighting of the directional representations of lighting for the identified set of probe positions.

18. A non-transitory computer readable storage medium having stored thereon processor executable instructions that when executed cause at least one processor to:

for each probe position of a plurality of probe positions within a scene, maintain a directional representation of lighting over a sequence of frames by:

updating an existing directional representation of lighting for the probe position from a previous frame based on a lighting contribution for each of the one or more rays; and use the directional representations of lighting for the probe positions for rendering a current frame representing an image of the scene.

* * * * *

UNITED STATES PATENT AND TRADEMARK OFFICE
CERTIFICATE OF CORRECTION

| | |
|---|---|
| PATENT NO. | : 11,127,198 B2 |
| APPLICATION NO. | : 16/858942 |
| DATED | : September 21, 2021 |
| INVENTOR(S) | : Jens Fursund and Luke T. Peterson |

Page 1 of 1

It is certified that error appears in the above-identified patent and that said Letters Patent is hereby corrected as shown below:

In the Specification

Column 9, Lines 42 and 43:
where the weights can be based on 1/d or 1/d2
Should read as:
where the weights can be based on $\frac{1}{d}$ or $\frac{1}{d^2}$ Column 10, Line 52 please replace:
"modeled" accurately
With:
--modelled-- accurately Column 11, Line 67 please replace:
"artifacts"
With:
--artefacts--

Signed and Sealed this
Tenth Day of May, 2022

Katherine Kelly Vidal
*Director of the United States Patent and Trademark Office*